United States Patent
Lee

(10) Patent No.: US 7,408,289 B2
(45) Date of Patent: Aug. 5, 2008

(54) PIEZOELECTRIC ACTUATOR, AND APPARATUS AND METHOD FOR ACTUATING THE SAME

(75) Inventor: Seung-bong Lee, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 115 days.

(21) Appl. No.: 11/406,181

(22) Filed: Apr. 17, 2006

(65) Prior Publication Data

US 2007/0069611 A1 Mar. 29, 2007

(30) Foreign Application Priority Data

Sep. 27, 2005 (KR) .................. 10-2005-0089688

(51) Int. Cl.
*H02N 2/00* (2006.01)
*H01L 41/08* (2006.01)

(52) U.S. Cl. .................. 310/323.02; 310/323.01; 310/323.17; 310/329; 310/12

(58) Field of Classification Search ............... 310/323.01–323.04, 323.17, 328, 12, 13
See application file for complete search history.

(56) References Cited

U.S. PATENT DOCUMENTS

| | | | | |
|---|---|---|---|---|
| 3,246,608 A | * | 4/1966 | Cooper | 104/134 |
| 4,630,941 A | * | 12/1986 | Chainer et al. | 384/1 |
| 4,692,652 A | * | 9/1987 | Seki et al. | 310/323.07 |
| 4,947,077 A | * | 8/1990 | Murata | 310/328 |
| 5,418,418 A | * | 5/1995 | Hirano et al. | 310/328 |
| 5,453,653 A | * | 9/1995 | Zumeris | 310/323.16 |
| 5,640,063 A | * | 6/1997 | Zumeris et al. | 310/328 |
| 5,672,930 A | * | 9/1997 | Narisawa et al. | 310/323.03 |
| 5,939,816 A | * | 8/1999 | Culp | 310/328 |
| 6,046,527 A | * | 4/2000 | Roopnarine et al. | 310/323.06 |
| 6,064,140 A | | 5/2000 | Zumeris | |
| 6,512,321 B2 | | 1/2003 | Yoshida et al. | |
| 6,617,759 B1 | * | 9/2003 | Zumeris et al. | 310/323.17 |
| 7,173,363 B2 | * | 2/2007 | Hendriks et al. | 310/328 |
| 2007/0114886 A1 | * | 5/2007 | D'Almeida et al. | 310/328 |

FOREIGN PATENT DOCUMENTS

| | | | |
|---|---|---|---|
| JP | 59-99977 | * | 6/1984 |
| JP | 63-083942 | * | 4/1988 |
| JP | 63-316675 | * | 12/1988 |
| JP | 63-316676 | * | 12/1988 |
| JP | 2003-181377 A | | 7/2003 |
| KR | 2002-0047794 A | | 6/2002 |

* cited by examiner

*Primary Examiner*—Thomas M Dougherty
(74) *Attorney, Agent, or Firm*—Drinker Biddle & Reath LLP

(57) ABSTRACT

A linear actuator using a metal beam-type piezoelectric material, and an apparatus and a method for actuating the same. The piezoelectric actuator includes: a moving member having a predetermined length and moving in a forward or a backward direction; and a piezoelectric portion contacting the moving member and moving the moving member linearly using a vibration generated when a piezoelectric element contracts or expands in response to an electrical signal.

36 Claims, 11 Drawing Sheets

PIEZOELECTRIC ACTUATOR, AND APPARATUS AND METHOD FOR ACTUATING THE SAME

CROSS-REFERENCE TO RELATED PATENT APPLICATIONS

This application claims the benefit of Korean Patent Application No. 10-2005-0089688, filed on Sep. 27, 2005, in the Korean Intellectual Property Office, the disclosure of which is incorporated herein by reference in its entirety.

BACKGROUND OF THE INVENTION

1. Field of the Invention

The present invention relates to a linear actuator using a metal beam-type piezoelectric material, and an apparatus and a method for actuating the same.

2. Description of the Related Art

Piezoelectric actuators have the advantages of low noise, small number of components, compact bulk structure, high precision, stabilizing compensation, and precise control. Thus, piezoelectric actuators are used instead of conventional actuators in many areas. In particular, the use of piezoelectric actuators in the field of digital cameras and CCTV cameras and aerospace applications has grown rapidly. Additionally, piezoelectric actuators that generate a linear force without conversion from a rotation motion to linear motion such as those in a conventional DC or step motor are expected to be used in core technologies for future industries.

Conventional methods of generating a linear motion in a piezoelectric actuator can be classified into three methods.

First, a linear motion is generated in the piezoelectric actuator by using a rotation motion. The rotation motion is generated using friction between a rotator and a stator such as that in a conventional DC or step motor. Then, a linear force is generated using a thread of a shaft. The method of generating the linear motion is the same as a conventional method using a motor; however, because a rotation force is generated when a piezoelectric material is excited at an ultrasonic bandwidth using a property of the piezoelectric material, the method has important advantages such as low noise, high resolution, stabilizing compensation, and precision.

Second, a linear motion is generated by friction with a surface of an external object. In this method, surface portions of components of an object to move linearly make point contact with an actuator, and the object is moved linearly by friction. In this case, a surface of the object that is in point contact with the actuator has a predetermined hardness so as to withstand frequent friction caused by a high-frequency motion of the actuator. Moreover, additional components should be powered to stop or fix the object.

Third, a linear motion is generated using a bulk (single-layer, stack) type piezoelectric actuator by lifting an object linearly. In this case, there is no friction with an external object. To obtain a linear motion, an additional support needs to be installed. An example of a liner motion obtained using this method is the up and down linear motion of a helicoil. Because the motion is a bulk-type motion, the displacement is limited. Also, additional elements should be powered to stop and fix the object. Since the bulk structure includes a piezoelectric material, which is a kind of a dielectric material, and an electrode between piezoelectric layers serves as a capacitor, less power is required for stopping and fixing the object.

In the piezoelectric actuator using a rotation motion disclosed in Japanese Patent Publication No. 2003-181377, to obtain a linear motion from the rotation motion, additional mechanical elements are needed. That is, a shaft is installed on a spindle connected to a rotor of the piezoelectric actuator and interlocks with a thread of the object to move so that the object can move linearly. When the rotation motion is used without changes, power should be transmitted to the object to move while being engaged with a gear train or a thread of an object to be rotated. In addition, noise is generated when the mechanical components contact each other during the operation of the piezoelectric actuator.

In the piezoelectric actuator disclosed in U.S. Pat. No. 6,064,140, a linear motion is generated through surface friction between an external object and an object to move. Thus, the surface of the object should be specially coated or a material having great hardness should be used on the surface of the object so that when a power transmission tip of the piezoelectric actuator contacts the surface of the object, power is transmitted without any loss and the surface of the object is not damaged. In this case, due to additional processes for manufacturing the object, the manufacturing cost of the piezoelectric actuator increases, the manufacturing time increases, and due to the increase of weight of the object, other design parameters should be further considered.

In the bulk-type actuator disclosed in U.S. Pat. No. 6,512,321, the displacement of an object is limited because the displacement of the object is proportional to the stack structure of a piezoelectric portion of the actuator and the intensity of an applied electric field. That is, if you want to obtain a larger amount of displacement from the actuator, since the actuator should be designed by stacking more piezoelectric layers and a high voltage should be applied to the actuator, the size of the actuator increases, costs increase, and much power is consumed.

SUMMARY OF THE INVENTION

The present invention provides a piezoelectric actuator in which to reduce friction noise between a gear train, a shaft, and a moving object, a moving portion of the actuator directly contacts the surface of a moving object and moves the object so that driving noise between the actuator and the object is not generated, and an apparatus and a method for actuating the same.

The present invention also provides a piezoelectric actuator in which an object is moved by pushing or pulling it so that there is no friction between the object and the other element, which can reduce the cost of manufacturing the object, and an apparatus and a method for actuating the same.

The present invention also provides a piezoelectric actuator with a large displacement, reduced number of stacked piezoelectric ceramics, and high voltage and high power consumption efficiency, wherein the displacement is proportional to the size of a moving portion of the actuator, and an apparatus and a method for actuating the same.

According to an aspect of the present invention, there is provided a piezoelectric actuator, the piezoelectric actuator including: a moving member having a predetermined length and moving in a forward or a backward direction; and a piezoelectric portion contacting the moving member and moving the moving member linearly using a vibration generated when a piezoelectric element contracts or expands in response to an electrical signal.

According to another aspect of the present invention, there is provided an apparatus for actuating a piezoelectric actuator, the apparatus including: a piezoelectric actuator, wherein the piezoelectric actuator includes: a moving member having a predetermined length and moving in a forward or a backward direction; and a piezoelectric portion contacting the moving member and moving the moving member linearly using a vibration generated when a piezoelectric element contracts or expands in response to an electrical signal; and an actuating unit calculating a moving direction and a moving speed of the piezoelectric actuator and generating electrical signals according to the result of the calculation to actuate the piezoelectric actuator.

According to another aspect of the present invention, there is provided a method of actuating a piezoelectric actuator including a moving member having a predetermined length and moving in a forward or a backward direction, and a piezoelectric portion contacting the moving member, divided into at least eight regions, and moving the moving member linearly using a vibration generated when a piezoelectric element contracts or expands in response to an electrical signal, the method including: receiving a signal for controlling a motion of the piezoelectric actuator in order to generate a sinusoidal wave having a predetermined amplitude; and applying the sinusoidal wave to arbitrary regions of the piezoelectric element to move the piezoelectric actuator in a forward or backward direction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The following detailed description refers to the accompanying drawings. The drawings show, and the detailed description provides, by way of illustration, specific illustrative embodiments of the invention. These embodiments are described in sufficient detail to enable those skilled in the art to practice the invention. Of course, other embodiments may be used and various changes may be made without departing from the scope of the present invention. Therefore, the following exemplary detailed description is not to be taken in a limiting sense.

Figure 1A:
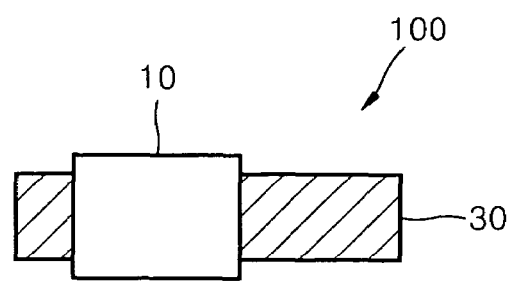
FIGS. 1A through 1C illustrates an appearance of a piezoelectric actuator, according to an embodiment of the present invention.
Figure 1B:
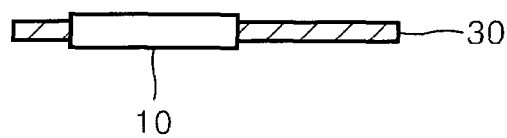
Figure 1C:
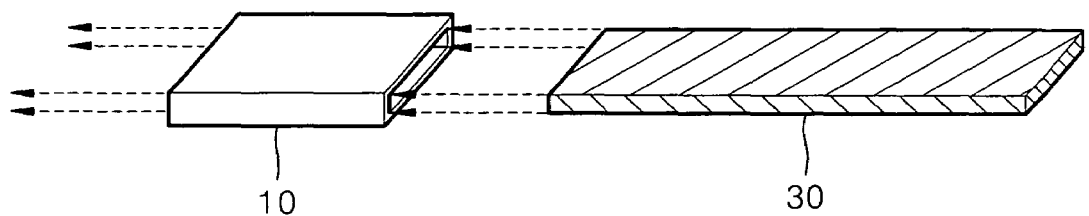

FIGS. 1A through 1C illustrate an appearance of a piezoelectric actuator 100, according an embodiment of the present invention. Referring to FIGS. 1A and 1B, the piezoelectric actuator 100 includes an external cover 10 and a metal beam 30. The entire appearance of the piezoelectric actuator 100 is similar to that of a thin lithium ion rechargeable battery. The external cover 10 and the metal beam 30, however, are separated from each other. The metal beam 30 has a predetermined length, and the external cover 10 surrounds at least a portion of the metal beam 30.

Referring to FIG. 1C, the metal beam 30 that moves linearly is separated from the external cover 10 having a piezoelectric portion 20. Then, the metal beam 30 is inserted into the external cover 10, thereby forming one actuator module.

The piezoelectric actuator of FIG. 1 may, for example, be of two types. In the first type, illustrated in FIGS. 2A through 2D, the piezoelectric actuator moves linearly by a progressive longitudinal wave generated in a piezoelectric layer. In the second type, illustrated in FIGS. 3A through 3D, the piezoelectric actuator moves linearly by a progressive latitudinal wave generated in a piezoelectric layer.

For convenience of explanation, in FIGS. 2A through 2D, only the piezoelectric actuator will be described.

Figure 2A:
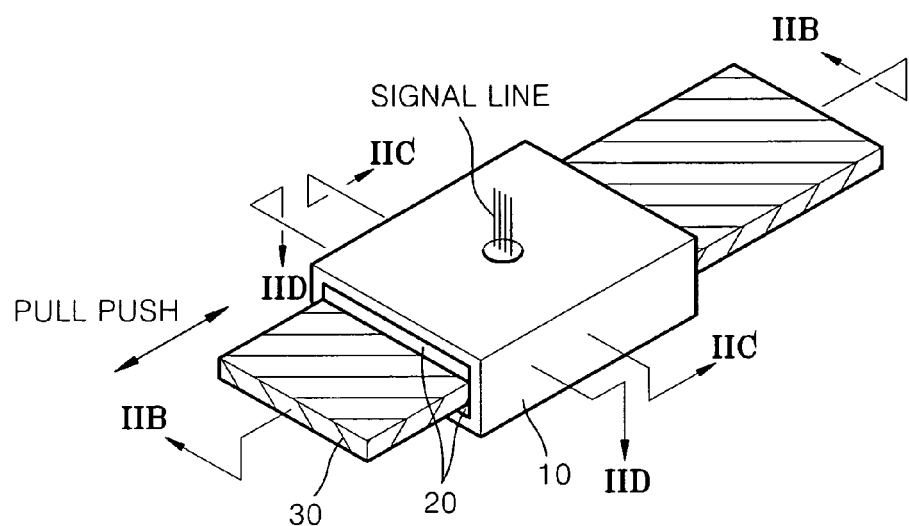
FIGS. 2A through 2D are detailed diagrams of a piezoelectric actuator that moves linearly using a progressive longitudinal wave generated in a piezoelectric layer, according to an embodiment of the present invention.

FIG. 2A is a perspective view of the piezoelectric actuator that moves linearly by a progressive longitudinal wave generated in a piezoelectric layer. The piezoelectric actuator includes an external cover 10, a piezoelectric portion 20, and a metal beam 30. Signal lines are connected to the piezoelectric portion 20 through a top surface of the external cover 10.

Figure 2B:
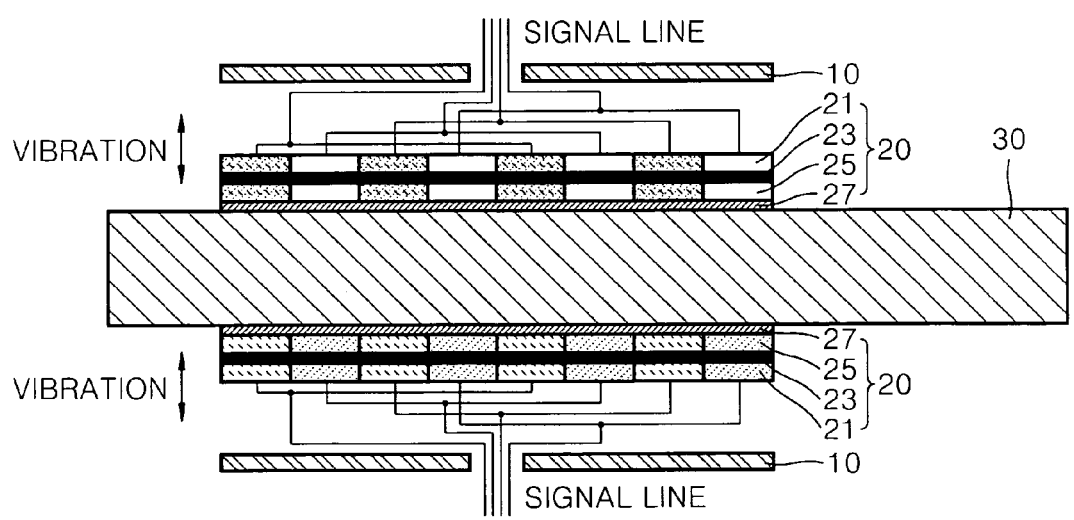

FIG. 2B is a cross-sectional view taken along line IIB-IIB of FIG. 2A. Referring to FIG. 2B, the piezoelectric portion 20 is interposed between an inside of the external cover 10 and top and bottom surfaces of the metal beam 30. The piezoelectric portion 20 includes an upper electrode layer 21, a piezoelectric layer 23, a lower electrode layer 25, and a metal layer 27. Alternatively, the piezoelectric layer may be arranged in a different manner (e.g., at other locations such as the sides of the metal beams, as exemplified by FIGS. 3A-3D, below).

The piezoelectric layer 23 is divided into eight regions and contracts or expands by an applied voltage, thereby vibrating laterally. For example, if a positive (+) voltage is applied to the piezoelectric layer 23, the piezoelectric layer 23 contracts, and if a negative (−) voltage is applied to the piezoelectric layer 23, the piezoelectric layer 23 expands. Of course, the piezoelectric layer 23 could be comprise of a number other than the eight provided in this example (and the example of FIGS. 3A-3D).

Figure 3A:
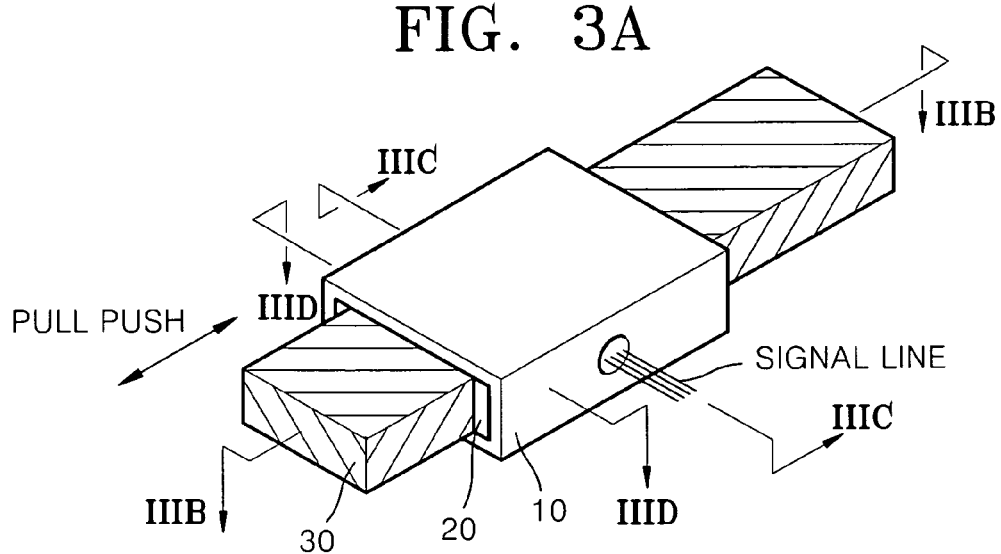
FIGS. 3A through 3D are detailed diagrams of a piezoelectric actuator that moves linearly using a progressive latitudinal wave generated in a piezoelectric layer, according to an embodiment of the present invention.
Figure 3B:
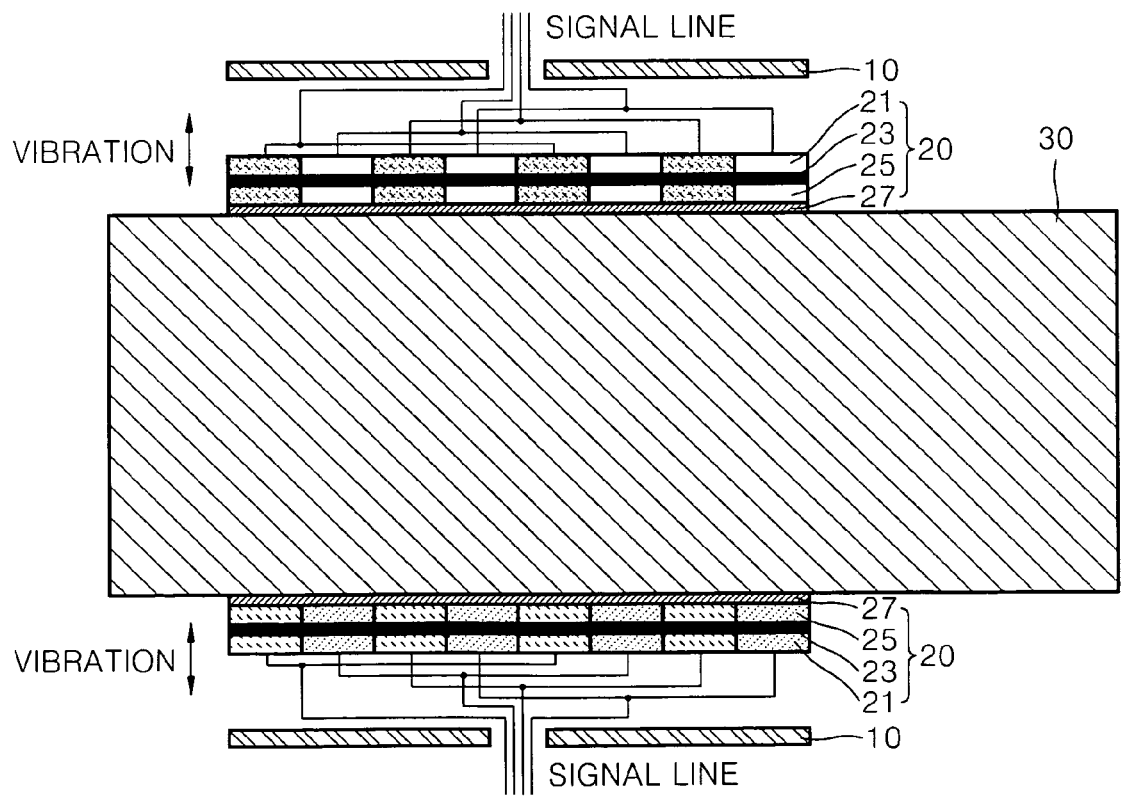
Figure 3C:
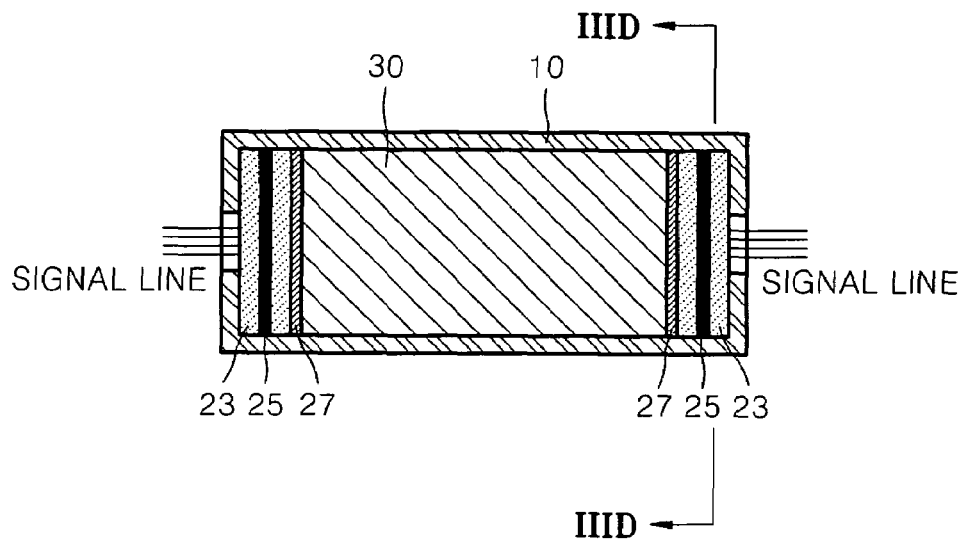
Figure 3D:
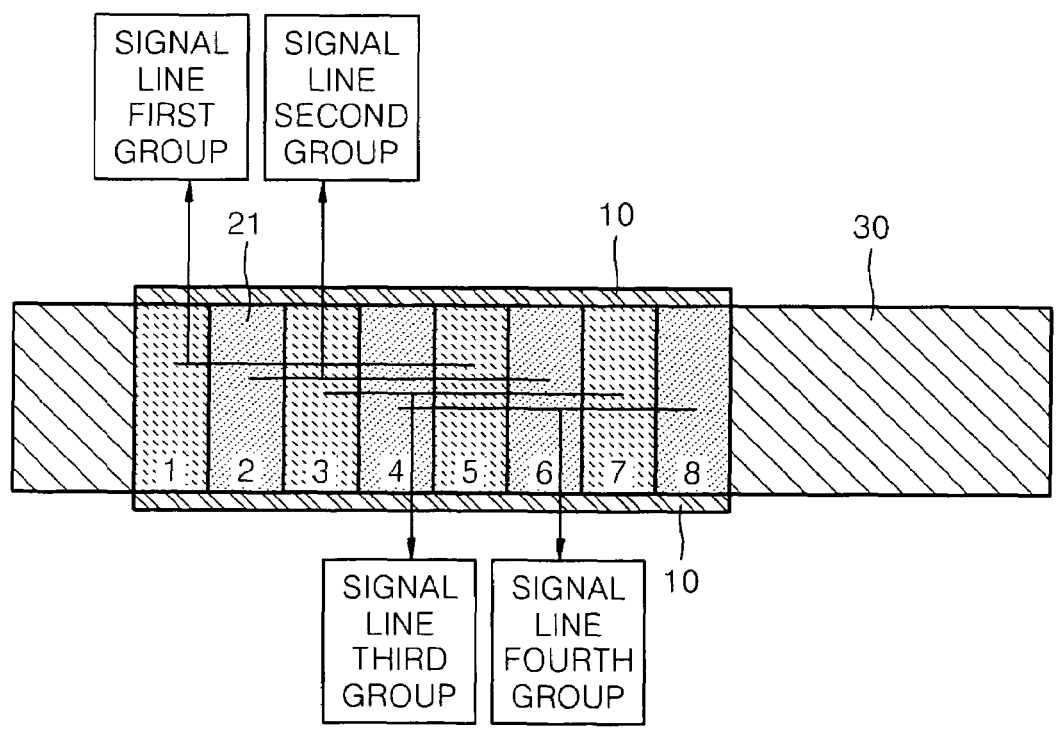

An electrode layer having the upper electrode layer 21 and the lower electrode layer 25 surrounds the piezoelectric layer 23 in a vertical direction, and eight electrodes 1 to 8 are aligned in the electrode layer at equivalent intervals (see FIG. 3D). As a result, a vibration region of the piezoelectric layer 23 is divided into eight regions.

The metal layer 27 transmits vibration generated when the piezoelectric layer 23 contracts or expands to the metal beam 30.

Figure 2C:
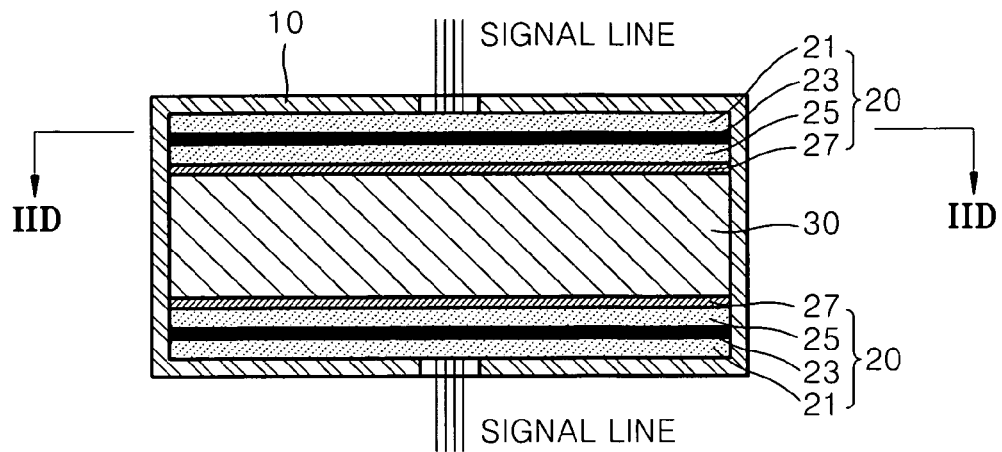

FIG. 2C is a cross-sectional view taken along line IIC-IIC of FIG. 2A. A gap between a surface of the piezoelectric layer 23 and top and bottom surfaces of the metal beam 30 is determined by a vibration amplitude of the piezoelectric layer 23. A side of the external cover 10 and a side of the metal beam 30 are separated from each other by a predetermined gap so that friction between them is minimized.

Figure 2D:
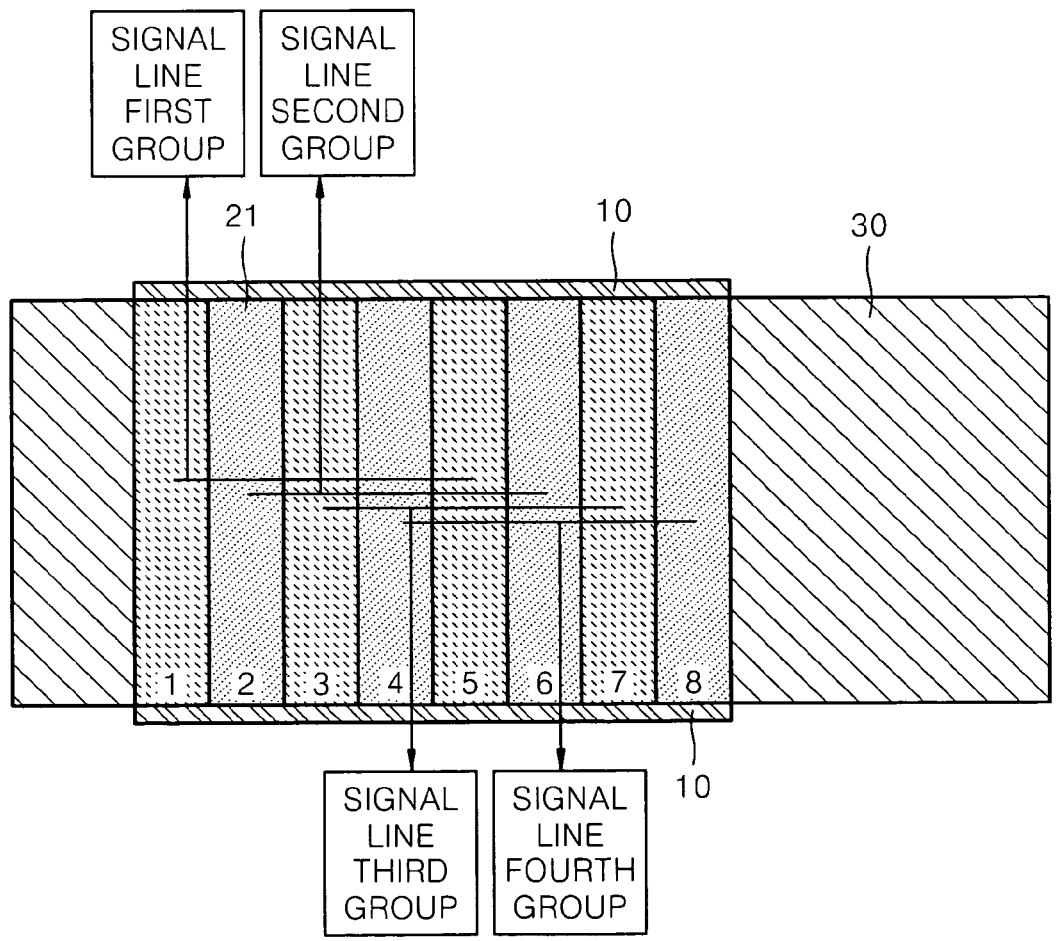

FIG. 2D is a cross-sectional view taken along line IID-IID of FIG. 2A.

The upper electrode layer 21 divided in the same way as the piezoelectric layer 23 is disposed on the piezoelectric layer 23 divided into eight regions. The upper electrode layer 21 forms a first signal line group in which a first region and a fifth region are electrically connected, a second signal line group in which a second region and a sixth region are electrically connected, a third signal line group in which a third region and a seventh region are electrically connected, and fourth a signal line group in which a fourth region and an eighth region are electrically connected. Of course, alternative combinations of connecting the regions are possible.

The operation of the piezoelectric actuator illustrated in FIG. 2 will now be described with reference to FIG. 4.

Figure 4A:
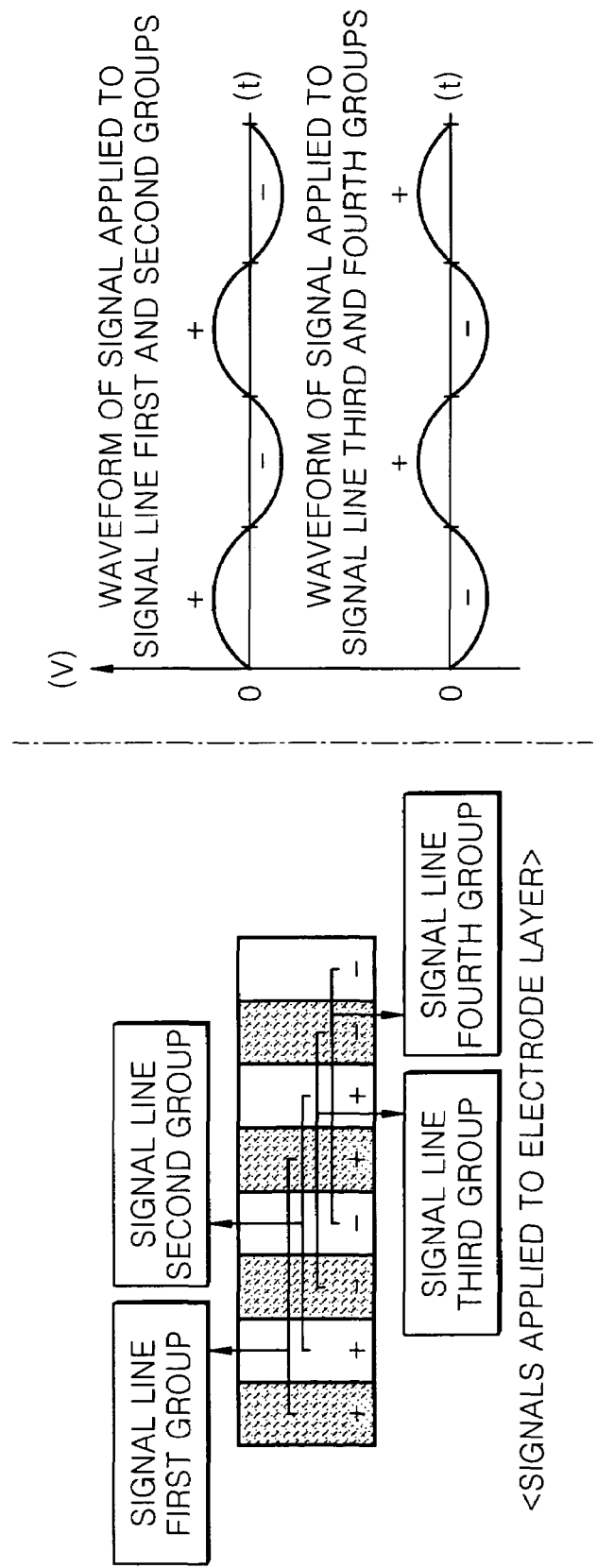
FIGS. 4A and 4B illustrate an operation of the piezoelectric actuator illustrated in FIG. 3.

FIG. 4A illustrates waveforms of signals applied to the electrode layer. Phases of waveforms of signals applied to the first signal line group and the second signal line group are opposite to those of waveforms of signals applied to the third signal line group and the fourth signal line group. Of course, this grouping scheme is provided by way of example, and other groupings of the signal lines are possible.

Figure 4B:
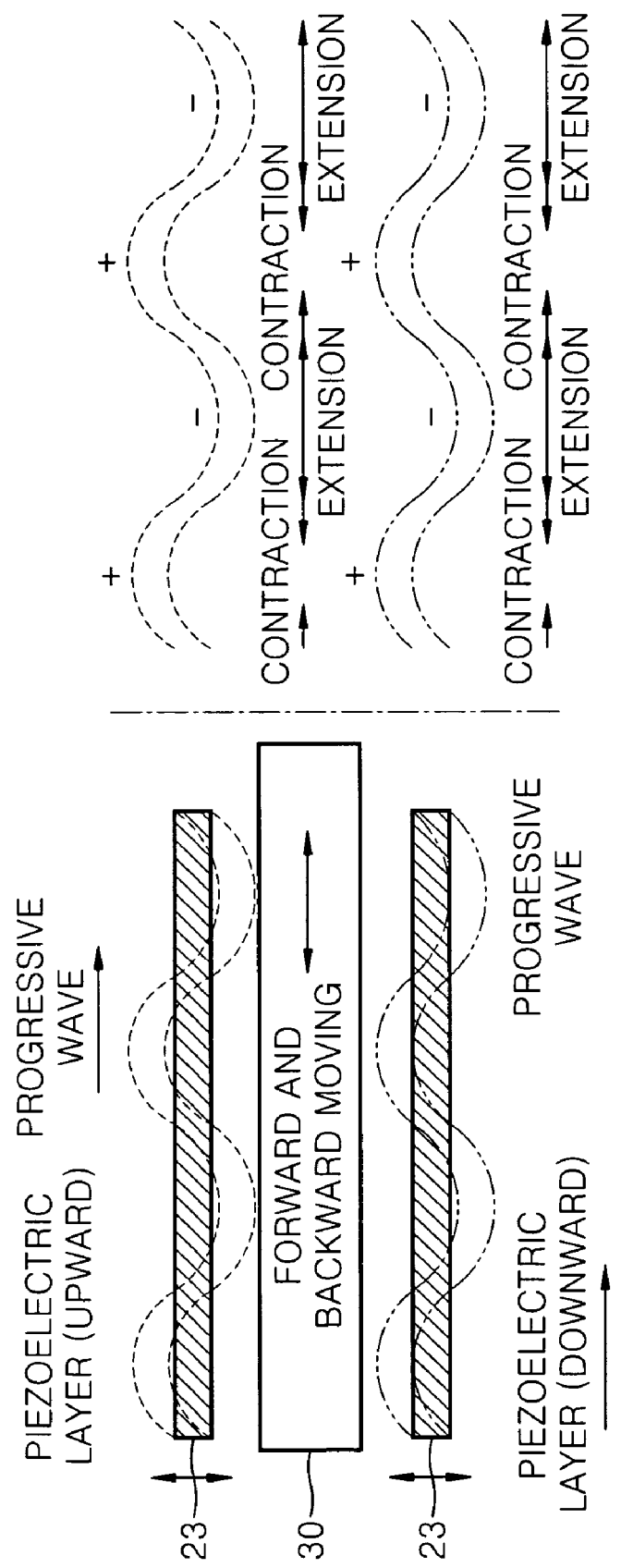

FIG. 4B illustrates the metal beam 30 that moves by vibration generated when the piezoelectric layer 23 contracts or expands by a voltage applied thereto.

A voltage signal having a frequency in the same bandwidth with a resonance frequency of the piezoelectric layer 23 is first generated and applied to the first signal line group and the third signal line group, and a voltage signal having a frequency in a bandwidth having a phase opposite to a resonance frequency of the piezoelectric layer 23 is generated and applied to the second signal line group and the fourth signal line group. Of course, alternative ways of applying the voltage signals are possible (e.g., different groupings of the signal lines could be made).

According to the polarity of the applied voltage signals, the piezoelectric layer 23 contracts in a region to which a positive (+) voltage is applied and expands in a region to which a negative (−) voltage is applied. Due to the contraction and expansion of the piezoelectric layer 23, progressive waves occur in the piezoelectric layer 23. Thus, the piezoelectric layer 23 vibrates longitudinally, and also the metal layer 27 vibrates with the same phase and amplitude as the piezoelectric layer 23. Additionally, because of the contact between the metal layer 27 and the metal beam 30, the metal layer 27 moves linearly in forward and backward directions. To change the direction of the progressive wave in the piezoelectric layer 23, voltage signals are applied to the second signal line group and the fourth signal line group.

For convenience of explanation, in FIGS. 3A through 3D, only the piezoelectric actuator will be described.

FIG. 3A is a perspective view of the piezoelectric actuator that moves linearly by a progressive latitudinal wave generated in a piezoelectric layer. The piezoelectric actuator includes an external cover 10, a piezoelectric portion 20, and a metal beam 30. Signal lines are connected to the piezoelectric portion 20 through a side surface of the external cover 10.

FIG. 3B is a cross-sectional view taken along line IIIB-IIIB of FIG. 3A. Referring to FIG. 3B, the piezoelectric portion 20 is interposed between an inside of the external cover 10 and both sides of the meal beam 30. The piezoelectric portion 20 includes an upper electrode layer 21, a piezoelectric layer 23, a lower electrode layer 25, and a metal layer 27.

The piezoelectric layer 23 is divided into eight regions and contracts or expands by an applied voltage, thereby vibrating laterally. For example, if a positive (+) voltage is applied to the piezoelectric layer 23, the piezoelectric layer 23 contracts, and if a negative (−) voltage is applied to the piezoelectric layer 23, the piezoelectric layer 23 expands.

An electrode layer having the upper electrode layer 21 and the lower electrode layer 25 surrounds the piezoelectric layer 23 in a vertical direction, and eight electrodes 1 to 8 are aligned in the electrode layer at equivalent intervals (see FIG. 3D). As a result, a vibration region of the piezoelectric layer 23 is divided into eight regions.

The metal layer 27 transmits vibration generated when the piezoelectric layer 23 contracts or expands to the metal beam 30.

FIG. 3C is a cross-sectional view taken along line IIIC-IIIC of FIG. 3A. A gap between a surface of the piezoelectric layer 23 and sides of the metal beam 30 is determined by a vibration amplitude of the piezoelectric layer 23. Upper and lower portions of the external cover 10 and upper and lower portions of the metal beam 30 are separated from each other by a predetermined gap so that friction between them is minimized.

FIG. 3D is a cross-sectional view taken along line IIID-IIID of FIG. 3A.

The upper electrode layer 21 divided in the same way as the piezoelectric layer 23 is disposed on a side of the piezoelectric layer 23 divided into eight regions. The upper electrode layer 21 forms a first signal line group in which a first region and a fifth region are electrically connected, a second signal line group in which a second region and a sixth region are electrically connected, a third signal line group in which a third region and a seventh region are electrically connected, and fourth a signal line group in which a fourth region and an eighth region are electrically connected.

The operation of the piezoelectric actuator illustrated in FIG. 3 will now be described with reference to FIG. 4.

FIG. 4A illustrates waveforms of signals applied to the electrode layer. Phases of waveforms of signals applied to the first signal line group and the second signal line group are opposite to those of waveforms of signals applied to the third signal line group and the fourth signal line group.

FIG. 4B illustrates the metal beam 30 that moves by vibration generated when the piezoelectric layer 23 contracts or expands by a voltage applied thereto.

A voltage signal having a frequency in the same bandwidth with a resonance frequency of the piezoelectric layer 23 is first generated and applied to the first signal line group and the third signal line group, and a voltage signal having a frequency in a bandwidth having a phase opposite to a resonance frequency of the piezoelectric layer 23 is generated and applied to the second signal line group and the fourth signal line group.

According to the polarity of the applied voltage signals, the piezoelectric layer 23 contracts in a region to which a positive (+) voltage is applied and expands in a region to which a negative (−) voltage is applied. Due to the contraction and expansion of the piezoelectric layer 23, progressive waves occur in the piezoelectric layer 23. Thus, the piezoelectric layer 23 vibrates latitudinally and, also, the metal layer 27 vibrates with the same phase and amplitude as the piezoelectric layer 23. Additionally, because of the contact between the metal layer 27 and the metal beam 30, the metal layer 27 moves linearly in forward and backward directions. To change the direction of the progressive wave in the piezoelectric layer 23, voltage signals are applied to the second signal line group and the fourth signal line group.

Figure 5:
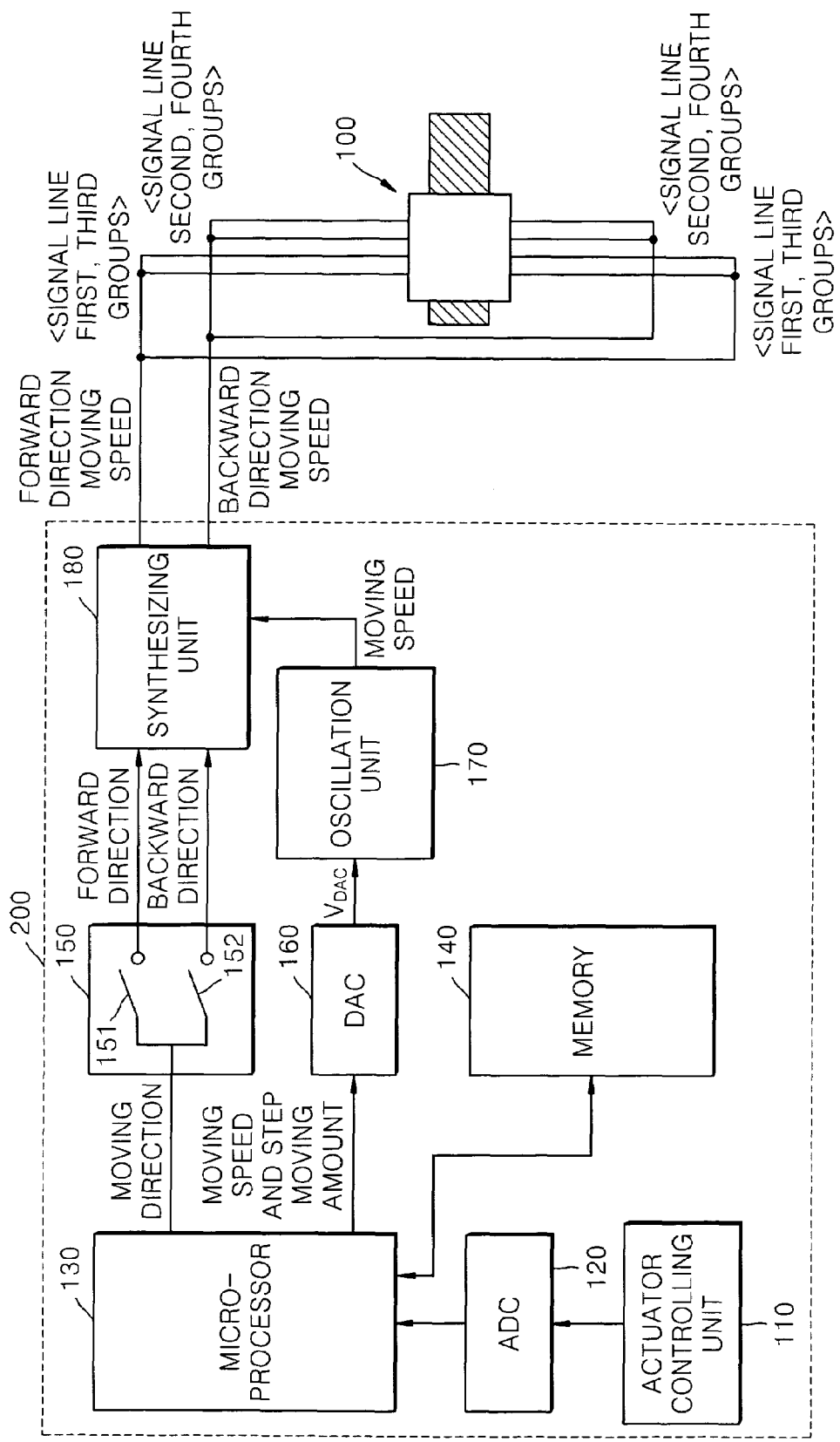
FIG. 5 is a block diagram of a structure of an apparatus for actuating a piezoelectric actuator, according to an embodiment of the present invention.

FIG. 5 is a block diagram of an apparatus 200 for actuating a piezoelectric actuator according to an embodiment of the present invention. The apparatus 200 includes a piezoelectric actuator 100, an actuator controlling unit 110, an ADC 120, a microprocessor 130, a memory 140, a switching unit 150 having a first switch 151 and a second switch 152, a DAC 160, an oscillation unit 170, and a synthesizing unit 180.

Figure 6A:
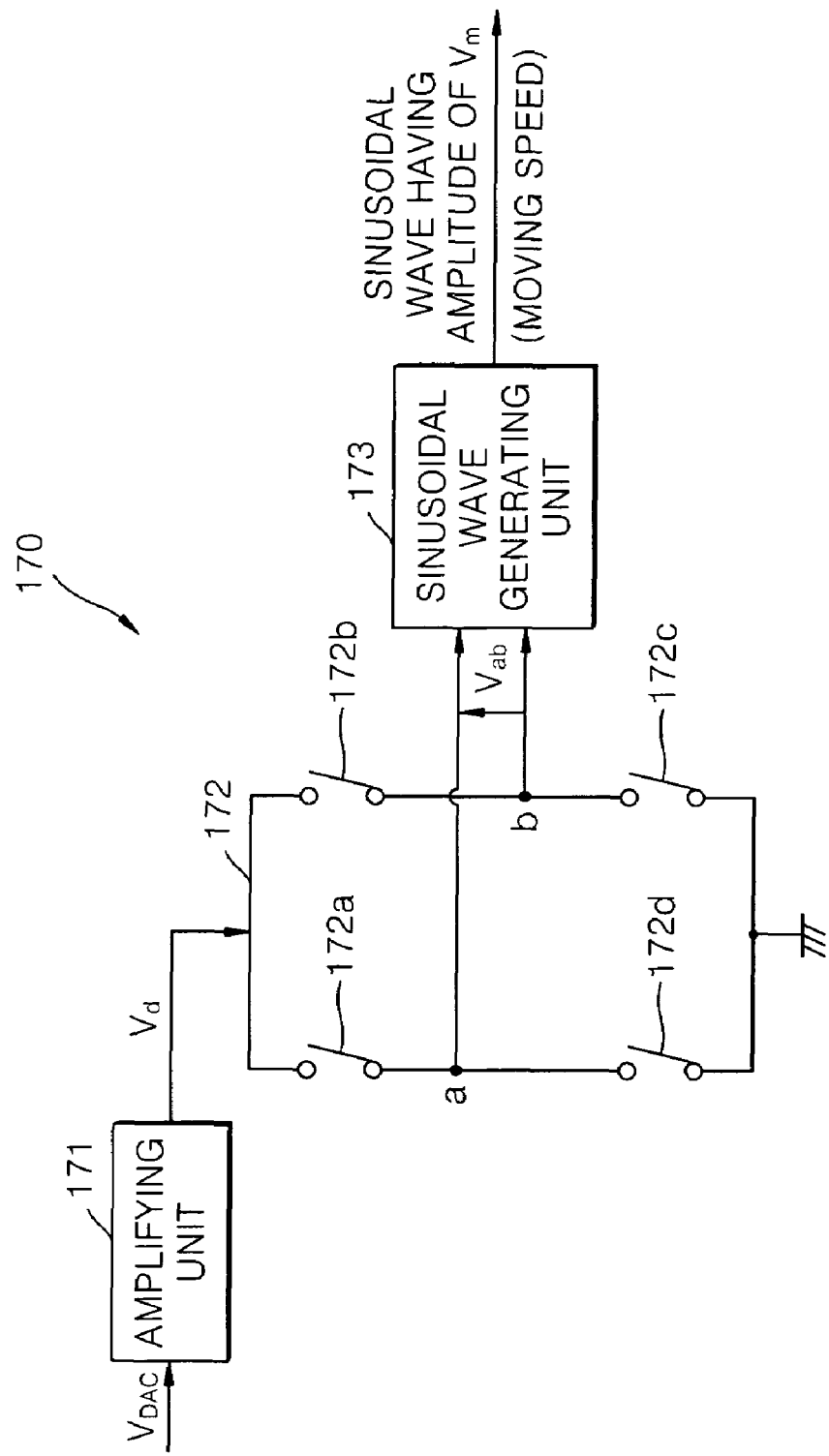
FIG. 6A is a detailed diagram of an oscillation unit of FIG. 5, according to an embodiment of the present invention.
Figure 6B:
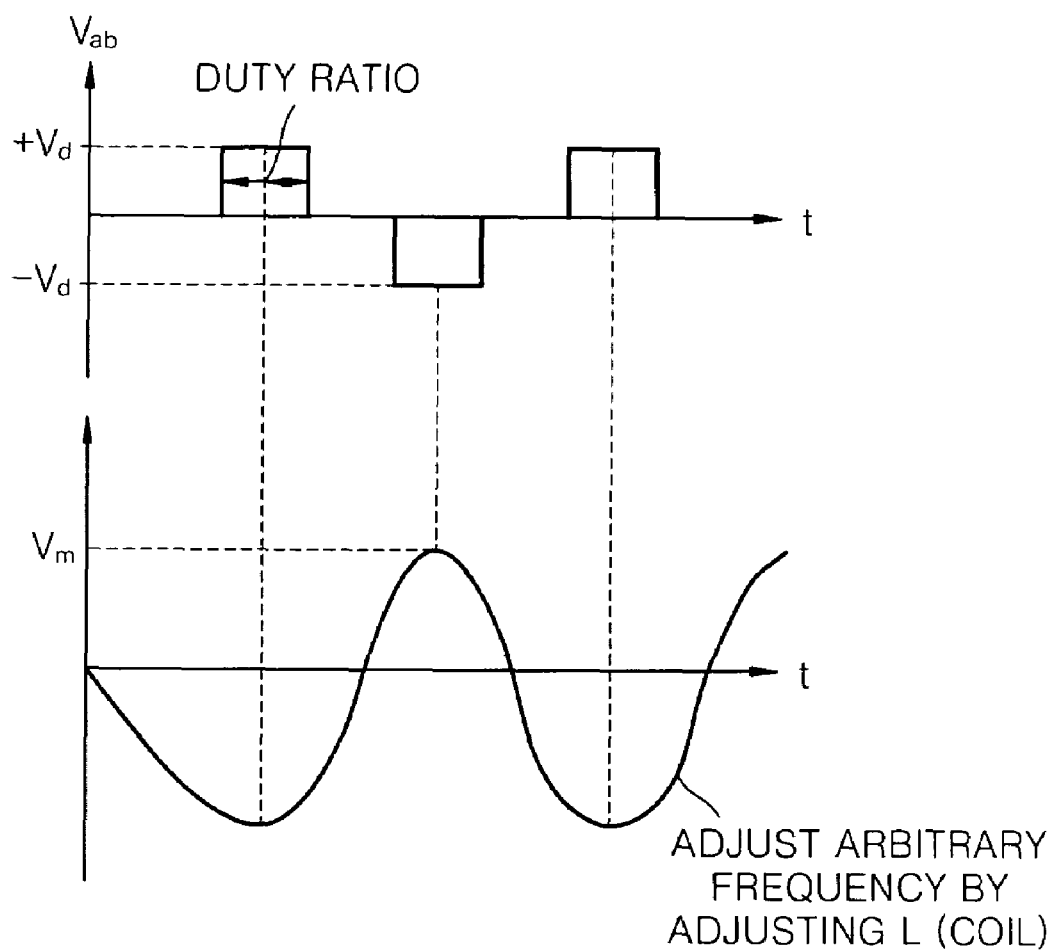
FIG. 6B is a waveform diagram for explaining FIG. 6A.

FIG. 6A is a detailed diagram of the oscillation unit of FIG. 5, according to an embodiment of the present invention, and FIG. 6B is a waveform diagram for explaining FIG. 6A. The oscillation unit 170 of FIG. 6A includes an amplifying unit 171, a switching unit 172 having first through fourth switches 172a-172d, and a sinusoidal wave generating unit 173.

The actuator controlling unit 110 controls a moving speed, a moving direction, and a motion amount of the piezoelectric actuator 100 in response to a user's command. For example, when the apparatus 200 is used in a digital camera, if a user presses a button to move a zoom lens of the digital camera, the actuator controlling unit 110 controls a moving speed, a moving direction, and a motion amount of the piezoelectric actuator 100 in response to the user's command (a button input signal).

The moving direction of the piezoelectric actuator 100 can be controlled by selecting the first signal line group and the third signal line group, and the second signal line group and the fourth signal line group, respectively, of the piezoelectric actuator 100. When voltage signals are applied to first the signal line group and the third signal line group of the piezoelectric layer 23 disposed above and below the piezoelectric actuator 100 by controlling the piezoelectric controlling unit 110, the piezoelectric actuator 100 moves, for example, in a forward direction. Then, when voltage signals are applied to the second signal line group and the fourth signal line group of the piezoelectric layer 23 by controlling the piezoelectric controlling unit 110, the piezoelectric actuator 100 moves, for example, in a backward direction.

The motion amount of the piezoelectric actuator 100 can be controlled by pulse width modulation (PWM) on the voltage signals applied to the piezoelectric actuator 100 from the actuator controlling unit 110.

A signal for controlling the moving speed, the moving direction, and the motion amount the piezoelectric actuator 100 is output from the piezoelectric controller 110 and input to the ADC 120. The ADC 120 converts the control signal into a digital signal, that is, a binary signal, so that the binary signal can be transmitted to the microprocessor 130 and simultaneously, the control signal serves as an index in a table stored in the memory 140.

The microprocessor 130 receives the signal for controlling the moving speed, the moving direction, and the motion amount of the piezoelectric actuator 100 after being converted into the digital signal by the ADC 120, and loads a corresponding command from the memory 140. Additionally, the microprocessor 130 controls the ADC 120 and the memory 130 and transmits a selection signal to the switching unit 150.

The memory 140 includes a previously input table for the moving speed, the moving direction, and the motion amount of the piezoelectric actuator 100, uses a digital signal output from the microprocessor 130 as an index, and transmits data corresponding to the index to the microprocessor 130.

A switching signal for selecting the moving direction is input to the switching unit 150 from the microprocessor 130. If a forward moving signal for the piezoelectric actuator 100 is received from the microprocessor 130, the first switch 151 is turned on, and electrical signals are applied to the first signal line group and the third signal line group. If a backward moving signal for the piezoelectric actuator 100 is received from the microprocessor 130, the second switch 152 is turned on, and electrical signals are applied to the second signal line group and the group signal line fourth.

The DAC 160 converts the digital signal for the moving speed and the motion amount output from the microprocessor 130 into a signal $V_{DAC}$ having an analog voltage level.

The oscillation unit 170 receives and amplifies the analog-converted signal $V_{DAC}$, generates a sinusoidal wave, and outputs the sinusoidal wave as speed information. The oscillation unit 170 includes an amplifying unit 171, a switching unit 172 having first through fourth switches 172a-172d, and a sinusoidal wave generating unit 173.

The amplifying unit 171 amplifies the analog-converted signal $V_{DAC}$ and generates a voltage signal $V_d$ having a sufficiently large level at which the piezoelectric layer 23 of the piezoelectric actuator 100 reacts. An amplification gain of the amplifying unit 171 is maintained constant, and the amplifying unit 171 changes an amplitude of the voltage signal $V_d$ by adjusting only a level of the input voltage $V_{DAC}$.

The amplified voltage signal $V_d$ is a DC voltage before it reaches the sinusoidal wave generating unit 173. After the amplified voltage signal $V_d$ reaches the switching unit 172 and the sinusoidal generating unit 173, a sinusoidal wave having an amplitude of a DC voltage is generated.

Referring to FIG. 6B, if the second switch 172b and the fourth switch 172d are turned on, a voltage difference (amplitude) of $-V_{ab}$ occurs, and if the first switch 173b and the third switch 173c are turned on, a voltage difference (amplitude) of $+V_{ab}$ occurs. The level of $V_{ab}$ is identical to a level of an output signal of the amplifying unit 171, that is, $V_d$, and a sign of $V_{ab}$ corresponds to the sign of a voltage difference caused by switching.

The sinusoidal wave generating unit 173 includes R/L/C passive elements. Referring to FIG. 6B, the sinusoidal generating unit 173 adjusts a frequency by adjusting the L passive element. The sinusoidal wave generating unit 173 generates a sinusoidal wave with the same frequency as a resonance frequency of the piezoelectric layer 23 used in the piezoelectric actuator 100 for soft and silent moving of the piezoelectric layer 23. A voltage difference $\pm V_{ab}$ output from the switching unit 172 is synthesized with a sinusoidal wave generated by the sinusoidal wave generating unit 173, and a sinusoidal wave having an amplitude $V_m$ of $\pm V_{ab}$ is generated.

At this time, PWM for controlling the motion amount is controlled by adjusting a switching time of the switching unit 170. For example, to generate a PWM signal having a duty ratio of 50%, the switching time of the switching unit 170 is equal to a switching time of the voltage signal $V_d$ output from the amplifying unit 171.

Referring to FIG. 6B, the synthesized sinusoidal wave having the constant amplitude $V_m$ is output as a speed signal, and a vibration occurs in the piezoelectric layer 23 of the piezoelectric actuator 100.

The synthesizing unit 180 synthesizes a moving direction signal switched by the switching unit 150 with a moving speed signal output from the oscillation unit 170 (a sinusoidal wave having the amplitude $V_m$) to output the synthesized signal to a signal line group of the piezoelectric actuator 100.

When the piezoelectric actuator 100 moves in a forward direction at a moving speed generated by the oscillation unit 170, output signals of the synthesizing unit 180 are applied to the first signal line group and the third signal line group. When the piezoelectric actuator 100 moves in a backward direction at the moving generated by the oscillation unit 170, output signals of the synthesizing unit 180 are applied to the second signal line group and the fourth signal line group. As described above, the first signal line group includes signals applied to the first and second regions of the piezoelectric layer 23, the second signal line group includes signals applied to second and sixth regions of the piezoelectric layer 23, the third signal line group includes signals applied to the third and seventh regions of the piezoelectric layer 23, and the fourth signal line group includes signals applied to the fourth and eighth regions of the piezoelectric layer 23.

When the piezoelectric actuator 100 illustrated in FIG. 5 is a piezoelectric actuator that moves linearly using a progressive longitudinal wave generated in a piezoelectric layer, as illustrated in FIGS. 2A through 2D, if moving speed signals (a sinusoidal wave having the amplitude of $V_m$) are applied to the first signal line group and the third signal line group, the piezoelectric actuator 100 generates a longitudinal vibration and moves in a forward direction. On the contrary, if moving speed signals (a sinusoidal wave having the amplitude of $V_m$) are applied to the second signal line group and the fourth signal line group, the piezoelectric actuator 100 generates a longitudinal vibration and moves in a backward direction.

When the piezoelectric actuator 100 illustrated in FIG. 5 is a piezoelectric actuator that moves linearly using a progressive latitudinal wave generated in a piezoelectric layer, as illustrated in FIGS. 3A through 3D, if moving speed signals (a sinusoidal wave having the amplitude of $V_m$) are applied to the first signal line group and the third signal line group, the piezoelectric actuator 100 generates a latitudinal vibration and moves in a forward direction. On the contrary, if moving speed signals (a sinusoidal wave having the amplitude of $V_m$) are applied to the second signal line group and the fourth signal line group, the piezoelectric actuator 100 generates a latitudinal vibration and moves in a backward direction.

Figure 7:
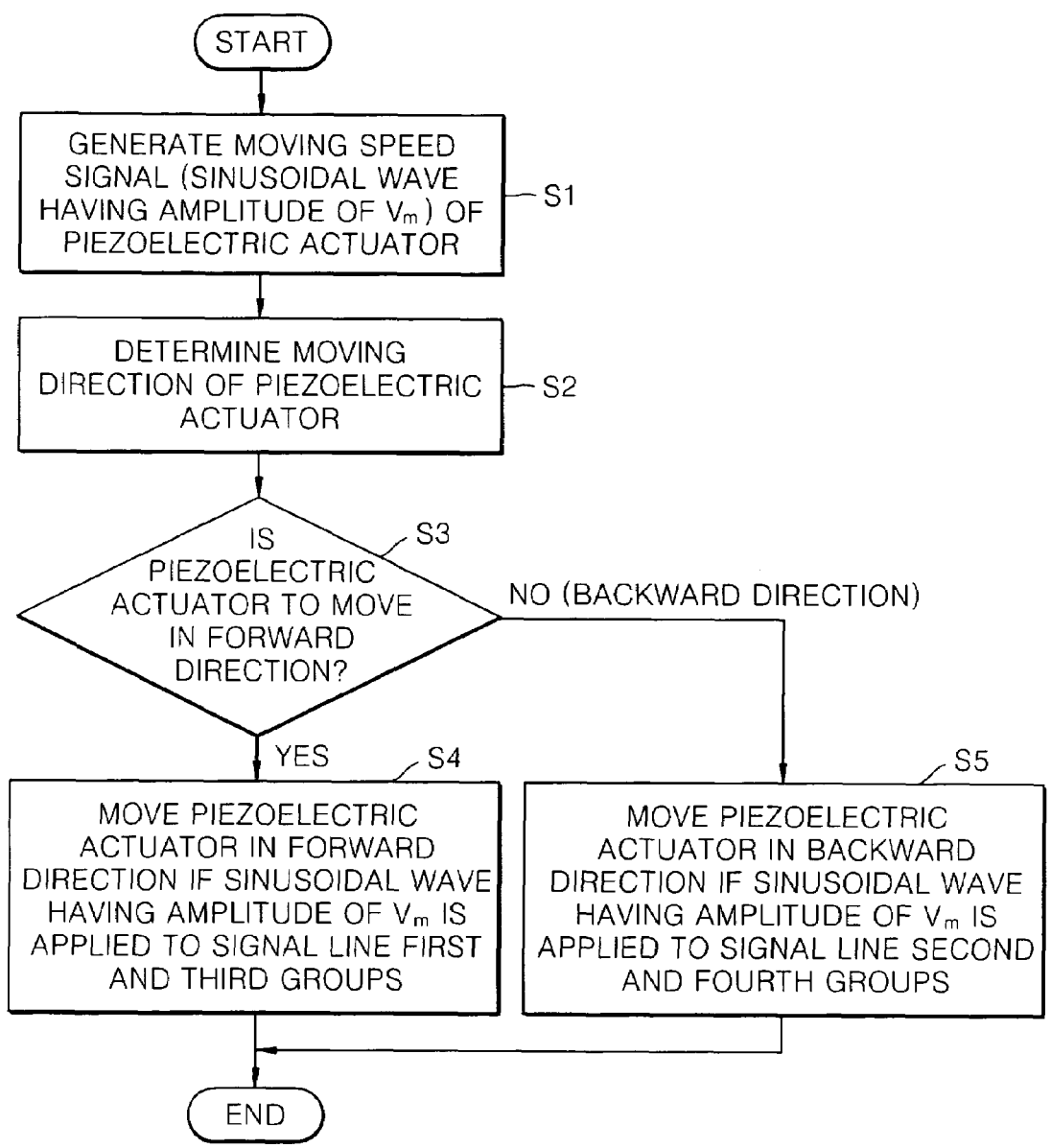
FIG. 7 is a flowchart illustrating a method of actuating a piezoelectric actuator, according to an embodiment of the present invention.

FIG. 7 is a flowchart illustrating a method of actuating the piezoelectric actuator 100 in the apparatus 200, according to an embodiment of the present invention.

Referring to FIG. 7, in operations S1 and S2, the apparatus 200 generates a moving speed signal for the piezoelectric actuator 100 in response to a user's command, determines a moving direction of the piezoelectric actuator 100, and outputs the moving speed signal.

The moving speed of the piezoelectric actuator 100 is determined by loading actual moving speed data of the piezoelectric actuator 100 from the memory 140 using the moving speed signal output to the microprocessor 130 from the actuator controlling unit 110 as an index, converting the moving speed data into an analog signal and then generating the analog signal as a sinusoidal wave having an amplitude of $V_m$ in the oscillation unit 170. The moving direction of the piezoelectric actuator 100 is changed by the switching unit 150 using a moving direction control signal output to the microprocessor 130 from the actuator controlling unit 110.

In operations S3, S4, and S5, when the piezoelectric actuator 100 moves in a forward direction, the first switching unit 151 is turned on, a sinusoidal wave signal having the amplitude of $V_m$ and output from the oscillation unit 170 is input to the first signal line group and the third signal line group of the piezoelectric actuator 100 so that the piezoelectric actuator 100 moves in a forward direction.

When the piezoelectric actuator 100 moves in a backward direction, the second switch 152 is turned on, and a sinusoidal wave signal having the amplitude of $V_m$ and output from the oscillation unit 170 is input to the second signal line group and the fourth signal line group of the piezoelectric actuator 100 so that the piezoelectric actuator 100 moves in a backward direction.

In the case of the piezoelectric actuator 100 that moves linearly using a progressive longitudinal wave generated in the piezoelectric layer as illustrated in FIGS. 2A through 2D, if the moving speed signal (a sinusoidal wave having the amplitude $V_m$) is applied to the first signal line group and the third signal line group, the piezoelectric actuator 100 generates a longitudinal vibration and moves in a forward direction. On the contrary, if the moving speed signal (the sinusoidal wave having the amplitude $V_m$) is applied to the second signal line group and the fourth signal line group, the piezoelectric actuator 100 generates a longitudinal vibration and moves in a backward direction.

In the case of the piezoelectric actuator 100 that moves linearly using a progressive latitudinal wave generated in the piezoelectric layer as illustrated in FIGS. 3A through 3D, if the moving speed signal (a sinusoidal wave having the amplitude $V_m$) is applied to the first signal line group and the third signal line group, the piezoelectric actuator 100 generates a latitudinal vibration and moves in a forward direction. On the contrary, if the moving speed signal (the sinusoidal wave having the amplitude $V_m$) is applied to the second signal line group and the fourth signal line group, the piezoelectric actuator 100 generates a latitudinal vibration and moves in a backward direction.

As described above, in the piezoelectric actuator and the apparatus and method for actuating the same according to the present invention, the moving portion of the piezoelectric actuator directly contacts the surface of a moving object and moves the object such that driving noise is not generated between the piezoelectric actuator and the moving object.

In addition, since the object is moved by pushing or pulling it, there is no friction between the object and other element of the piezoelectric actuator and, thus, a specific material and additional processes for manufacturing the moving object are not necessary.

Also, since the dimensions of contacting components for linearly moving the object can be increased, the moving amount of the object can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A piezoelectric actuator comprising:
   a moving member having a predetermined length; and
   a piezoelectric portion contacting the moving member, the piezoelectric portion comprising:
   a piezoelectric layer comprising a plurality of regions;
   a first electrode layer divided into the same number of regions as the piezoelectric layer, disposed on a first side the piezoelectric layer, and applying electrical signals to the regions of the piezoelectric layer;
   a second electrode layer divided into the same number of regions as the piezoelectric layer, disposed on a second side of the piezoelectric layer that is opposite the first side, and applying electrical signals to the regions of the piezoelectric layer; and
   a metal layer transmitting the vibration of the piezoelectric layer to the moving member; wherein the piezoelectric layer generates a contraction vibration or an expanding vibration in response to an electrical signal to move the moving member linearly in response to the contraction vibration or the expanding vibration.

2. The piezoelectric actuator of claim 1, wherein the moving member moves in a forward or a backward direction.

3. The piezoelectric actuator of claim 2, further comprising a cover separated from the moving member, surrounding a portion of the moving member, and including the piezoelectric portion.

4. The piezoelectric actuator of claim 2, wherein the piezoelectric portion contacts at least one of the upper portion and the lower portion of the moving member and generates a vertical vibration.

5. The piezoelectric actuator of claim 2, wherein the piezoelectric portion contacts at least one of a first side and a second side of the moving member and generates a horizontal vibration.

6. The piezoelectric actuator of claim 1, wherein the piezoelectric layer and the first and second electrode layers are divided into at least eight regions.

7. The piezoelectric actuator of claim 3, wherein the piezoelectric layer and the first and second electrode layers are divided into at least eight regions.

8. The piezoelectric actuator of claim 4, wherein the piezoelectric layer and the first and second electrode layers are divided into at least eight regions.

9. The piezoelectric actuator of claim 5, wherein the piezoelectric layer and the first and second electrode layers are divided into at least eight regions.

10. The piezoelectric actuator of claim 1, wherein the moving speed of the moving member varies according to levels of the electrical signals.

11. The piezoelectric actuator of claim 3, wherein the moving speed of the moving member varies according to levels of the electrical signals.

12. The piezoelectric actuator of claim 4, wherein the moving speed of the moving member vanes according to levels of the electrical signals.

13. The piezoelectric actuator of claim 5, wherein the moving speed of the moving member varies according to levels of the electrical signals.

14. The piezoelectric actuator of claim 1, wherein the phase of the electric signal applied a first one of the plurality of regions of the piezoelectric layer is opposite to the phase of the electric signal applied to a second one of the plurality of regions of the piezoelectric layer.

15. The piezoelectric actuator of claim 1, wherein phases of the electric signals applied to a first/fifth region and a second/sixth region of the piezoelectric layer are opposite to phases of the electrical signals applied to a third/seventh region and a fourth/eighth region of the piezoelectric layer.

16. The piezoelectric actuator of claim 3, wherein the phase of the electric signal applied a first one of the plurality of regions of the piezoelectric layer is opposite to the phase of the electric signal applied to a second one of the plurality of regions of the piezoelectric layer.

17. The piezoelectric actuator of claim 3, wherein phases of the electric signals applied to a first/fifth region and a second/sixth region of the piezoelectric layer are opposite to phases of the electrical signals applied to a third/seventh region and a fourth/eighth region of the piezoelectric layer.

18. The piezoelectric actuator of claim 4, wherein the phase of the electric signal applied a first one of the plurality of regions of the piezoelectric layer is opposite to the phase of the electric signal applied to a second one of the plurality of regions of the piezoelectric layer.

19. The piezoelectric actuator of claim 4, wherein phases of the electric signals applied to a first/fifth region and a second/sixth region of the piezoelectric layer are opposite to phases of the electrical signals applied to a third/seventh region and a fourth/eighth region of the piezoelectric layer.

20. The piezoelectric actuator of claim 5, wherein the phase of the electric signal applied a first one of the plurality of regions of the piezoelectric layer is opposite to the phase of the electric signal applied to a second one of the plurality of regions of the piezoelectric layer.

21. The piezoelectric actuator of claim 5, wherein phases of the electric signals applied to a first/fifth region and a second/sixth region of the piezoelectric layer are opposite to phases of the electrical signals applied to a third/seventh region and a fourth/eighth region of the piezoelectric layer.

22. The piezoelectric actuator of claim 15, wherein, if the electrical signals are applied to the first/fifth region and the third/seventh region of the piezoelectric layer, the moving member moves in a forward direction.

23. The piezoelectric actuator of claim 17, wherein, if the electrical signals are applied to the first/fifth region and the third/seventh region of the piezoelectric layer, the moving member moves in a forward direction.

24. The piezoelectric actuator of claim 19, wherein, if the electrical signals are applied to the first/fifth region and the third/seventh region of the piezoelectric layer, the moving member moves in a forward direction.

25. The piezoelectric actuator of claim 21, wherein, if the electrical signals are applied to the first/fifth region and the third/seventh region of the piezoelectric layer, the moving member moves in a forward direction.

26. The piezoelectric actuator of claim 22, wherein, if the electrical signals are applied to the second/sixth region and the fourth/eighth region of the piezoelectric layer, the moving member moves in a backward direction.

27. The piezoelectric actuator of claim 23, wherein, if the electrical signals are applied to the second/sixth region and the fourth/eighth region of the piezoelectric layer, the moving member moves in a backward direction.

28. The piezoelectric actuator of claim 24, wherein, if the electrical signals are applied to the second/sixth region and the fourth/eighth region of the piezoelectric layer, the moving member moves in a backward direction.

29. The piezoelectric actuator of claim 25, wherein, if the electrical signals are applied to the second/sixth region and the fourth/eighth region of the piezoelectric layer, the moving member moves in a backward direction.

30. An apparatus for actuating a piezoelectric actuator, comprising:
a piezoelectric actuator, wherein the piezoelectric actuator comprises:
a moving member having a predetermined length and moving in a forward or a backward direction; and
a piezoelectric portion contacting the moving member, wherein the piezoelectric portion moves the moving member linearly using a vibration generated when the piezoelectric portion contracts or expands in response to an electrical signal; and
an actuating unit comprising:
a controlling unit outputting a moving direction, a moving speed, and a motion amount of the piezoelectric actuator in response to a received command;
a switching unit changing the moving direction, forward or backward, of the piezoelectric actuator in response to a moving direction signal of the controlling unit;
an oscillation unit generating the moving speed signal of the controlling unit as a sinusoidal wave having a predetermined amplitude; and
a synthesizing unit synthesizing the switched direction signal and the sinusoidal wave to output the synthesized signal to the piezoelectric actuator and apply the sinusoidal wave to a first/fifth region and a third/seventh region of the piezoelectric element to move the piezoelectric actuator in a forward direction at the moving speed.

31. The apparatus of claim 30, wherein the piezoelectric portion of the piezoelectric actuator contacts at least on of the upper portion and the lower portion of the moving member and generates a vertical vibration in response to the electrical signals.

32. The apparatus of claim 30, wherein the piezoelectric portion of the piezoelectric actuator contacts at least one of a first side and a second side of the moving member and generates a horizontal vibration in response to the electrical signals.

33. The apparatus of claim 30, wherein the piezoelectric portion is divided into at least eight regions.

34. The apparatus of claim 30 wherein the synthesizing unit applies the sinusoidal wave to a second/sixth region and a fourth/eighth region of the piezoelectric portion to move the piezoelectric actuator in a backward direction at the moving speed.

35. A method of actuating a piezoelectric actuator including a moving member having a predetermined length and moving in a forward or a backward direction, and a piezoelectric portion contacting the moving member, divided into at least eight regions, and moving the moving member linearly using a vibration generated when the piezoelectric portion contracts or expands in response to an electrical signal, the method comprising:

receiving a signal for controlling a motion of the piezoelectric actuator to generate a sinusoidal wave having a predetermined amplitude; and applying the sinusoidal wave to arbitrary regions of the piezoelectric portion to move the piezoelectric actuator in a forward or backward direction, wherein, if the sinusoidal wave is applied to a first/fifth region and a third/seventh region of the piezoelectric portion, the moving member moves in a forward direction.

36. The method of claim 35, wherein, if the sinusoidal wave is applied to a second/sixth region and a fourth/eighth region of the piezoelectric portion, the moving member moves in a backward direction.

* * * * *